(12) United States Patent
Stewart, III (10) Patent No.: US 8,752,795 B2
(45) Date of Patent: Jun. 17, 2014

(54) INLET NOSE COWL WITH A LOCALLY THICKENED FASTENING PORTION TO ENABLE AN UNINTERRUPTED AIRFLOW SURFACE

(76) Inventor: John Ralph Stewart, III, Somis, CA (US)

( * ) Notice: Subject to any disclaimer, the term of this patent is extended or adjusted under 35 U.S.C. 154(b) by 231 days.

(21) Appl. No.: 13/299,314

(22) Filed: Nov. 17, 2011

(65) Prior Publication Data

US 2012/0126062 A1 May 24, 2012

Related U.S. Application Data (60) Provisional application No. 61/416,412, filed on Nov. 23, 2010.

(51) Int. Cl.
*B64C 1/06* (2006.01)
(52) U.S. Cl.
USPC .......................................................... 244/131
(58) Field of Classification Search
USPC ............... 244/134 R, 123.1, 129.1, 131, 132; 403/365; 411/178; 29/525.01
See application file for complete search history.

(56) References Cited

U.S. PATENT DOCUMENTS

| 4,863,326 | A | 9/1989 | Vickers |
| 5,014,934 | A | 5/1991 | McClaflin |
| 5,752,674 | A * | 5/1998 | Mears et al. ............... 244/134 R |
| 6,543,721 | B2 * | 4/2003 | Palm ........................ 244/117 R |
| 7,494,092 | B2 * | 2/2009 | Brenner et al. ................. 244/119 |
| 7,992,822 | B2 * | 8/2011 | Kato et al. ..................... 244/132 |
| 2001/0048048 | A1 * | 12/2001 | Riedel et al. ................. 244/53 B |
| 2004/0255572 | A1 | 12/2004 | Porte |
| 2005/0247756 | A1 | 11/2005 | Frazer et al. |
| 2008/0135329 | A1 | 6/2008 | Strunk et al. |
| 2008/0164376 | A1 * | 7/2008 | Kato et al. ..................... 244/132 |
| 2008/0296433 | A1 * | 12/2008 | Brenner et al. ............. 244/129.1 |

FOREIGN PATENT DOCUMENTS

WO  WO 2010/001008 A1  1/2010

OTHER PUBLICATIONS

PCT International Search Report and Written Opinion for PCT/US2011/061682, mailed Mar. 30, 2012, 13 pages.
"Keylocking Threaded Inserts", Acme Industrial Company, Copyright 2010, 36 pages.

* cited by examiner

*Primary Examiner* — Tien Dinh
*Assistant Examiner* — Michael A Fabula
(74) *Attorney, Agent, or Firm* — Blakely, Sokoloff, Taylor & Zafman LLP (57) ABSTRACT

An aircraft component includes an exterior surface exposed to external airflow during flight, an interior surface, and a locally thickened fastening portion between the exterior and interior surfaces. An area of the interior surface on the locally thickened fastening portion is substantially parallel to an area of the exterior surface on the locally thickened fastening portion. The thickness of the aircraft component between the exterior surface and the interior surface is greater at the fastening portion than at an area surrounding the fastening portion. When the additional component is fastened to the substantially parallel area of the interior surface on the fastening portion with mechanical fasteners, the mechanical fasteners do not penetrate the exterior surface.

10 Claims, 7 Drawing Sheets

INLET NOSE COWL WITH A LOCALLY THICKENED FASTENING PORTION TO ENABLE AN UNINTERRUPTED AIRFLOW SURFACE

CROSS-REFERENCE TO RELATED APPLICATIONS

This application claims the benefit of U.S. Provisional Patent Application No. 61/416,412, filed Nov. 23, 2010, which is hereby incorporated by reference in its entirety.

FIELD

Embodiments of the present invention relate generally to the field of aerospace and, in particular, components for aircraft.

BACKGROUND

The fuel efficiency of modern commercial jet aircraft has become an increasingly important factor in sustaining profitable business operations. Lighter material systems, higher performing and more fuel efficient engines, and improvements in the aerodynamic performance of the aircraft as a whole are three dominant areas that are targeted for increasing fuel efficiency of modern commercial jet aircraft.

Jet engine nacelles are the housings that surround the jet engines on jet aircraft. These nacelles are typically mounted under the wing of the aircraft or on the sides of the fuselage of the aircraft. The nacelle performs a number of important functions such as structurally mounting the jet engine to the aircraft, providing fuel and aircraft system connections to the jet engine, directing air into the engine, reversing engine thrust during aircraft landings, and a host of other critically important functions. As jet engines have grown larger in diameter as a direct result of becoming more fuel efficient, it has become increasingly important that the nacelle which surrounds the jet engine become more aerodynamically efficient to result in less drag and better fuel efficiency.

Given that nacelles on multi-engine jet aircraft comprise a significant percentage of the total frontal cross-sectional area of the entire aircraft, nacelles are one of the best areas for improving aerodynamic performance of the overall aircraft. One of the primary means of improving the aerodynamic performance of the jet engine nacelle is by improving the leading edge surfaces of the nacelle to make these leading edges more aerodynamically efficient. Keeping the airflow attached to the leading edges of the nacelle improves the aerodynamic performance of the nacelle. The further aft on the nacelle the airflow is kept attached, the greater the resulting aerodynamic performance. This attachment of the airflow to the airflow surface is commonly referred to as laminar flow.

As the airflow moves aft on the surfaces of the leading edge of the nacelle, it becomes increasingly important that these surfaces remain completely smooth to facilitate adherence of the airflow to the surface. Minute disruptions in the leading edge surfaces of the nacelle can be caused by such issues as nacelle component split lines, nacelle component steps and gaps, surface irregularities, waviness of the nacelle components, paint lines, and fasteners. These disruptions all have the potential of negatively impacting the desired effect of creating a surface where the airflow will remain attached. Disruptions in airflow along the leading edge of the nacelle results in turbulent airflow that increases aerodynamic drag on the nacelle and on the overall aircraft.

The nacelle component at the leading edge of the jet engine nacelle is commonly referred to as the inlet nose cowl. The inlet nose cowl fulfills a number of functions on the overall nacelle system such as containing a means to keep ice from forming on the leading edge surfaces, providing structural integrity to resist damage from hail, bird strike, and man loading, and to serve as an aesthetically pleasing component on the aircraft. From an engine nacelle aerodynamic performance standpoint, however, the inlet nose cowl fulfills a primary role. To improve the aerodynamic performance of the nacelle, the inlet nose cowl can be designed so that the surfaces take full advantage of laminar flow benefits. One approach includes increasing the forward to aft length of the inlet nose cowl to the practical limits. For example, the inlet nose cowl can be designed so that it extends all the way to the aft bulkhead of the nacelle inlet and thus does not include a mid-span circumferential split line that would otherwise disrupt laminar flow. Furthermore, doors, access panels, and cutouts can be placed aft of a laminar flow area on the inlet nose cowl so that laminar flow is maintained for as great a distance as possible.

Figure 1:
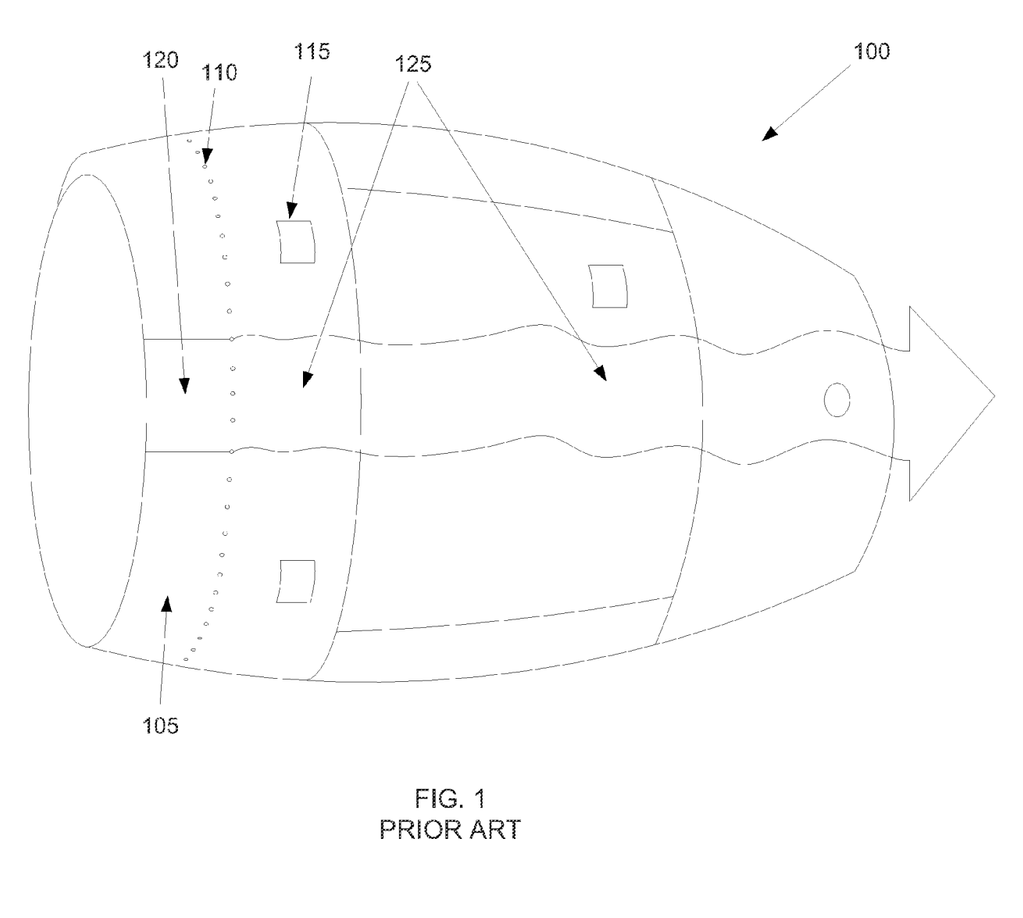
FIG. 1 illustrates airflow over a nacelle including an inlet nose cowl and fasteners that penetrate the airflow surface of the inlet nose cowl.

While the above-described design features can be achieved with relatively low technical and manufacturing difficulty, fasteners that penetrate the external airflow surface of an inlet nose cowl disrupt the laminar flow. For example, FIG. 1 illustrates a nacelle 100 including an inlet nose cowl 105, and fasteners 110 that penetrate the external airflow surface of the inlet nose cowl 105. The airflow surface of the nacelle 100 also includes other features, such as access panels or doors 115. While the inlet nose cowl 105, and the nacelle 100 in general, may include fasteners in other locations, only a single series of fasteners 110 is illustrated so as not to obscure the present description and illustration of airflow. As the airflow travels from the leading edge of the inlet nose cowl 105, it initially maintains a smooth adherence to the surface of the inlet nose cowl 105. This laminar flow 120, however, is disrupted by the fasteners 110 that penetrate the airflow surface of the inlet nose cowl 105. A turbulent flow 125 continues aft from the series of fasteners 110. The access panels or doors 115, or other features, may also contribute to the turbulent flow 125.

The use of fasteners that penetrate the external airflow surface of the inlet nose cowl persists for a variety of reasons. For example, inlet nose cowls operate in a structurally demanding environment. They must withstand critical design loads while remaining durable and lightweight. This has necessitated and advanced the design of inlet nose cowls that are manufactured from thin and lightweight sheet metal that can achieve acceptable operating results after being mechanically attached to other components such as bulkheads and stiffening frames with fasteners that penetrate the inlet nose cowl and lie, in part, on the external air flow surface. Each fastener, if not installed to the most stringent tolerances, will disrupt laminar flow. It is not uncommon for an inlet nose cowl to have several hundred fasteners, increasing the likelihood that fasteners will disrupt laminar flow.

Attempts to use metal bonding as a replacement for fasteners that penetrate to the external airflow surface of the inlet nose cowl have produced unacceptable results because metal bonding alone has yet to be shown to withstand the high temperatures necessary to keep ice from forming on the inlet nose cowl and the surface area of the bonded interface is insufficient to meet necessary performance requirements. Other methods, such as fusion welding and friction stir welding are plagued with technical difficulties and do not have design allowable values such as flat-wise tension, tensile, fatigue, thermal, corrosive, and so forth to allow an efficient design to be initiated. From a manufacturing standpoint, both of these processes would be unable to fully restore the material temper to an acceptable and homogenous condition, and from a part processing standpoint, the risk of entrapping corrosive chemicals between the welded components during cleaning and the submersed application of protective coatings would be difficult to prevent. Furthermore, the non-destructive methods of inspecting the welded joints are costly and time consuming.

SUMMARY

An aircraft component is described. The aircraft component includes an exterior surface exposed to external airflow during flight, an interior surface, and a locally thickened fastening portion between the exterior and interior surfaces. The thickness of the aircraft engine housing component between the exterior surface and the interior surface is greater at the fastening portion than at an area surrounding the fastening portion. An area of the interior surface on the locally thickened fastening portion is substantially parallel to an area of the exterior surface on the locally thickened fastening portion. The locally thickened fastening portion is configured such that an additional component can be fastened to the substantially parallel area of the interior surface on the locally thickened fastening portion. When the additional component is fastened to the fastening portion with mechanical fasteners, the mechanical fasteners do not penetrate the exterior surface. In one embodiment, the aircraft component is an inlet nose cowl.

A method of attaching a component to an inlet nose cowl of an aircraft engine housing component is also described. The inlet nose cowl includes an exterior surface exposed to external airflow during flight, an interior surface, and a locally thickened fastening portion between the exterior and interior surfaces. An area of the interior surface on the locally thickened fastening portion is substantially parallel to an area of the exterior surface on the locally thickened fastening portion. The method includes fastening the component to the substantially parallel area of the interior surface on the locally thickened fastening portion of the interior surface of the inlet nose cowl with mechanical fasteners. The thickness of the inlet nose cowl between the exterior surface and the interior surface is greater at the fastening portion than at an area surrounding the fastening portion, such that the mechanical fasteners do not penetrate the exterior surface of the inlet nose cowl.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements, and in which.

DETAILED DESCRIPTION

An inlet nose cowl and method of attaching a component to an inlet nose cowl are described. The inlet nose cowl includes an exterior surface exposed to external airflow during flight, an interior surface, and a locally thickened fastening portion between the exterior and interior surfaces. The thickness of the inlet nose cowl between the exterior surface and the interior surface is greater at the fastening portion than at an area surrounding the fastening portion. An area of the interior surface on the locally thickened fastening portion is substantially parallel to an area of the exterior surface on the locally thickened fastening portion. When an additional component (e.g., a bulkhead, stiffener frame, etc.) is fastened to the substantially parallel area of the interior surface on locally thickened fastening portion with mechanical fasteners, the mechanical fasteners do not penetrate the exterior surface. As a result, the airflow surface is not disrupted by the fasteners, reducing drag and improving aerodynamic performance of the airflow surface. In addition to increasing fuel efficiency, not having the fasteners penetrate the airflow surface eliminates the forming/occurrence of corrosion and erosion on the airflow surface around the fasteners. Removing the fasteners from the visible surface also results in a more cosmetically appealing component.

Figure 2:
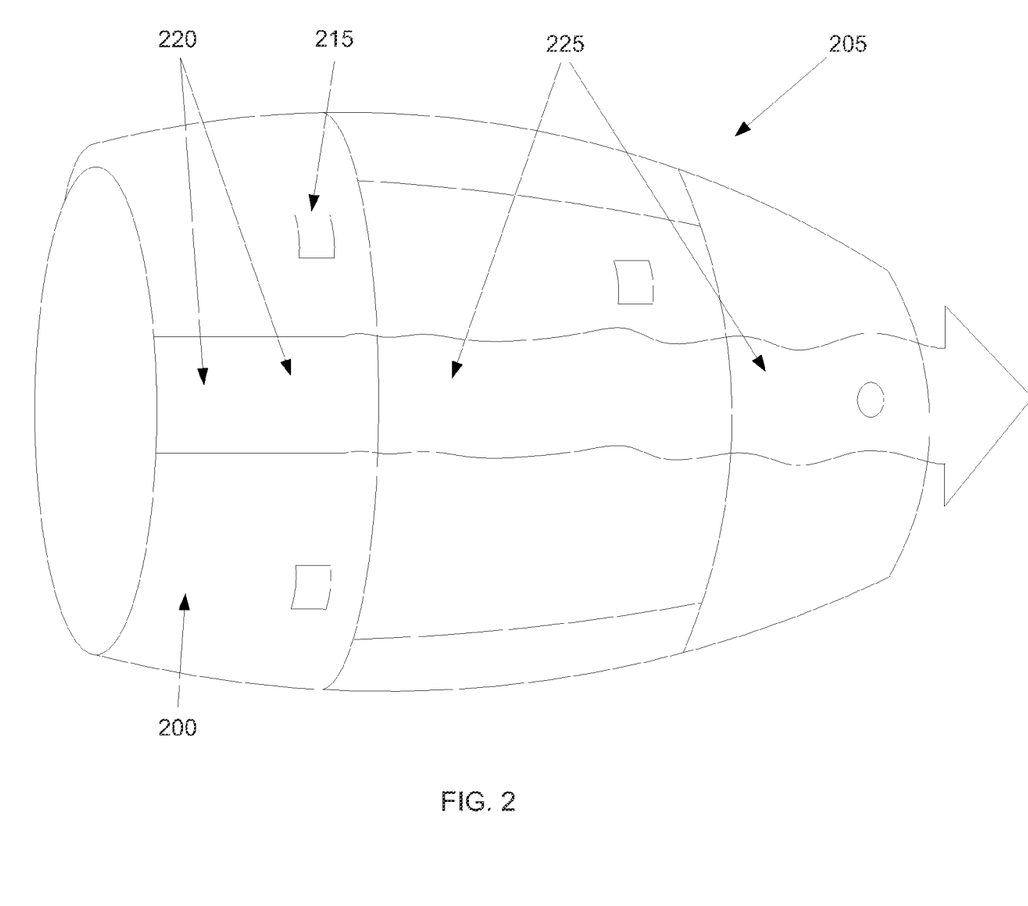
FIG. 2 illustrates airflow over a nacelle including an inlet nose cowl and fasteners that do not penetrate the airflow surface of the inlet nose cowl according to an embodiment of the invention.

FIG. 2 illustrates airflow over a nacelle 205 including an inlet nose cowl 200 and fasteners that do not penetrate the airflow surface of the inlet nose cowl 200. As the airflow travels from the leading edge of the inlet nose cowl 200, it initially maintains a smooth adherence to the surface of the inlet nose cowl 200 and nacelle 205. This laminar flow 220 remains undisturbed over a greater distance than the laminar flow 120 of the nacelle 100 described above. The laminar flow 220 may be eventually disrupted by another feature of the airflow surface of the inlet nacelle 205. For example, an access panel or door 215 may disrupt the laminar flow 220. A turbulent flow 225 continues aft from the point(s) of disruption.

Figure 3:
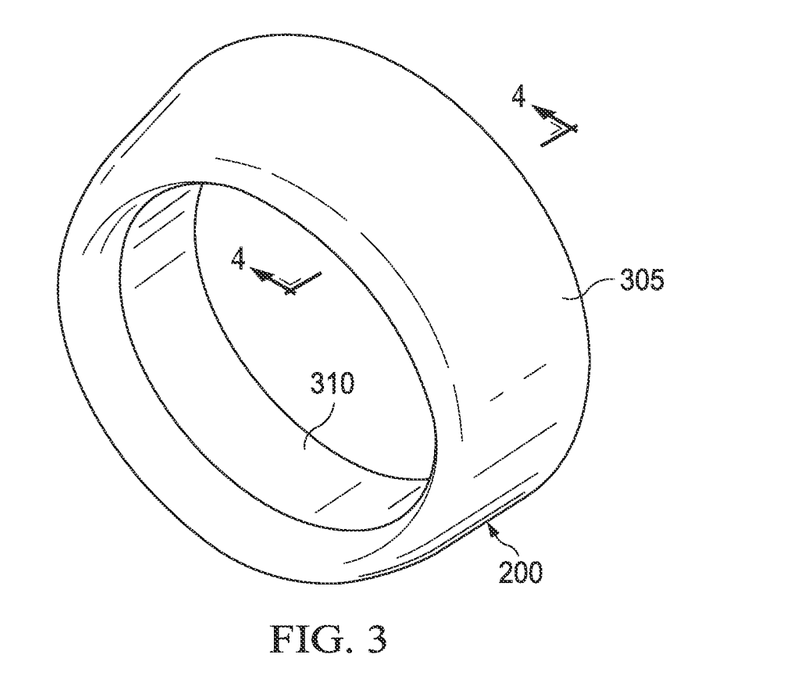
FIG. 3 shows a perspective view of an inlet nose cowl according to an embodiment of the invention.

FIG. 3 shows a perspective view of an inlet nose cowl 200 according to an embodiment of the invention. The inlet nose cowl 200 includes an exterior surface 305 exposed to external airflow during flight and an interior surface 310. In one embodiment, the inlet nose cowl 200 is manufactured from aluminum sheet metal. In alternate embodiments, the inlet nose cowl 200 is manufactured from titanium, stainless steel, or another metal or composite material. The double arrow 4 indicates a location of a cross-section illustrated and described with reference to FIG. 4.

Figure 4:
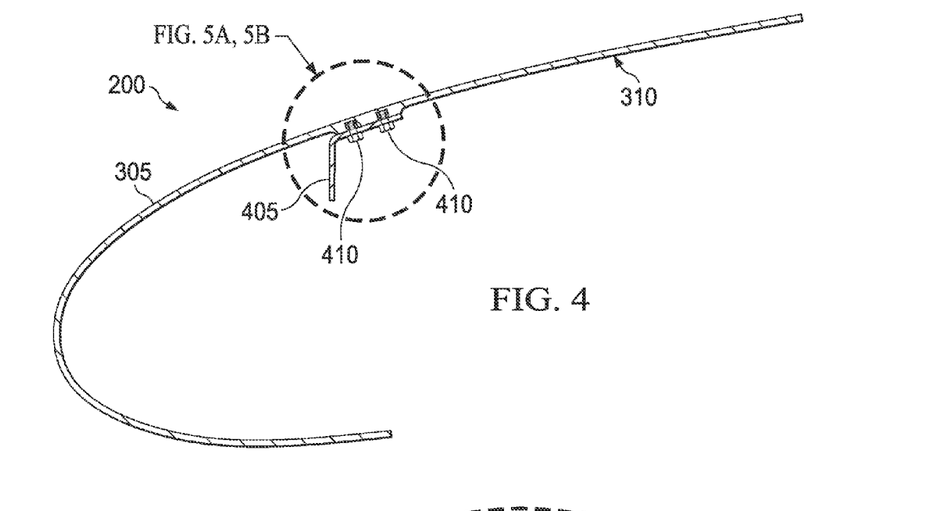
FIG. 4 shows a cross-sectional view of the inlet nose cowl illustrated in FIG. 3 including a component coupled to the interior surface of the inlet nose cowl according to an embodiment of the invention.

FIG. 4 shows a cross-sectional view of the inlet nose cowl 200 illustrated in FIG. 3. A component 405, such as an angled and curved piece of sheet metal, is coupled to the interior surface 310 of the inlet nose cowl 200 by way of mechanical fasteners 410. The component 405, for example, represents a connection for a bulkhead, a stiffener frame, or other component to be attached to the interior surface 310. In one embodiment, the mechanical fasteners 410 are bolts. In an alternate embodiment, the mechanical fasteners 410 are screws, bolts, blind fasteners, custom designed fasteners, or other similar mechanical fasteners. The area encircled in broken line indicates the area of the inlet nose cowl 200 and component 405 that are shown by way of close-up view in FIGS. 5A and 5B.

Figure 5A:
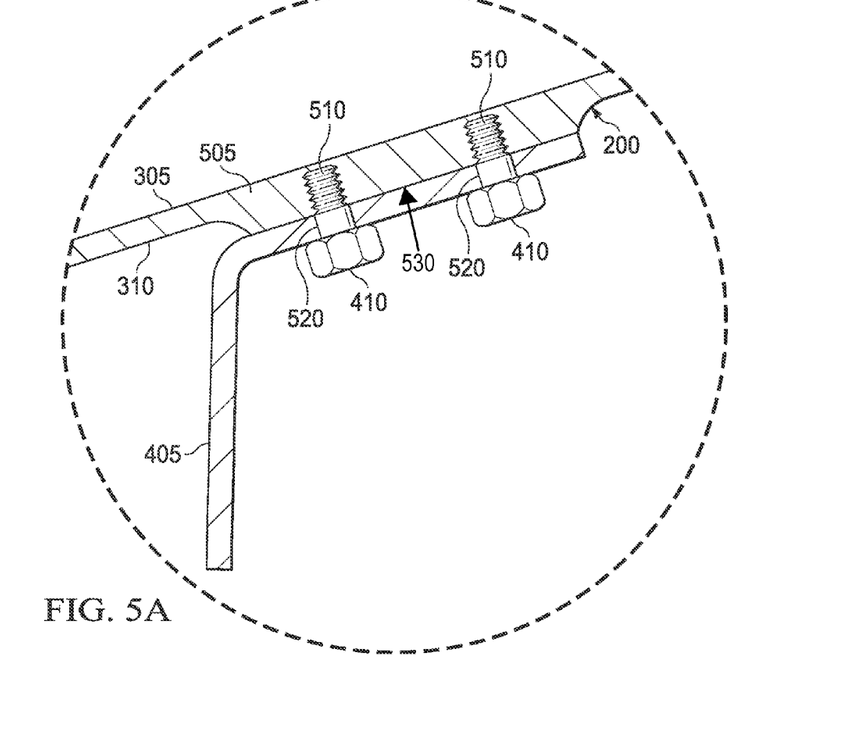
FIGS. 5A and 5B show close-up views of the component coupled to the interior surface of the inlet nose cowl in the cross-sectional view illustrated in FIG. 4 according to alternate embodiments.
Figure 5B:
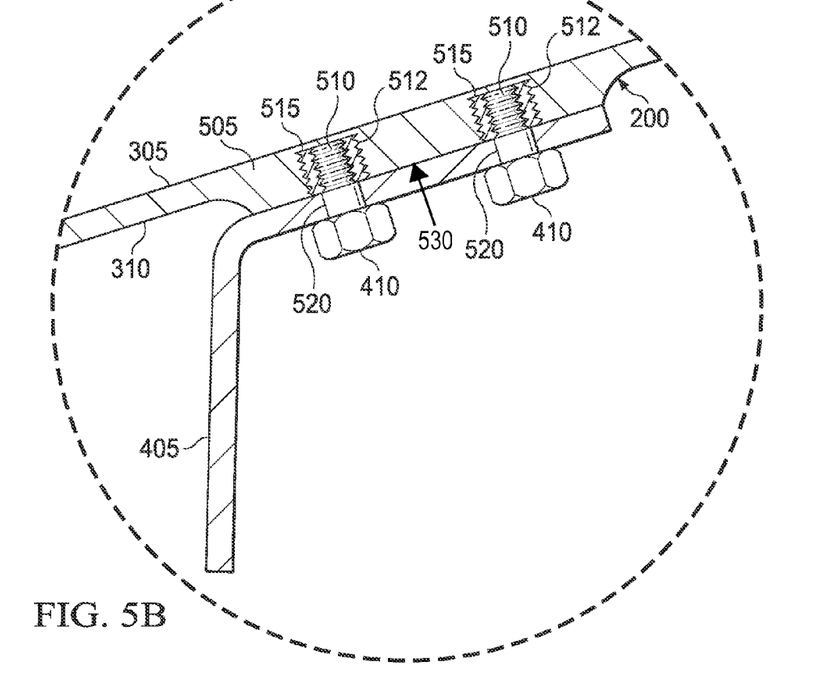

FIGS. 5A and 5B each show a close-up view of the component 405 coupled to the interior surface 310 of the inlet nose cowl 200 in the cross-sectional view illustrated in FIG. 4 according to alternate embodiments. The inlet nose cowl 200 includes a locally thickened fastening portion 505 that is sufficiently thick to support a fastener that meets the design loads of the joint. The thickness of the inlet nose cowl 200 between the exterior surface 305 and the interior surface 310 is greater at the fastening portion 505 than at an area surrounding (e.g., on either side of) the fastening portion 505. In one embodiment, the thickness of the locally thickened fastening portion 505 between the exterior surface 305 and the interior surface 310 at the fastening portion 505 is at least twice as thick as the thickness of inlet nose cowl 200 between the exterior surface 305 and the interior surface 310 at the area surrounding the fastening portion 505.

The area of the interior surface 310 on the locally thickened fastening portion 505 is substantially parallel to an area of the exterior surface 305 on the locally thickened fastening portion 505. As used herein, substantially parallel refers to the two surfaces being parallel or, if they deviate from being parallel, within 30 degrees of being parallel. Additionally, substantially parallel as used herein applies to surfaces that are not planar, such as substantially parallel or offset curves. For example, referring to FIG. 4, exterior surface 305 and interior surface 310 are both curved surfaces. As used herein, illustrated exterior surface 305 and interior surface 310 are substantially parallel in the area where the component 405 is coupled to the interior surface 310 on the locally thickened fastening portion 505.

In one embodiment, the locally thickened fastening portion 505 includes a plurality of holes 510 that penetrate the interior surface 310 but do not penetrate the exterior surface 305 of the inlet nose cowl 200. In one embodiment, the holes 510 include internal threading to receive and secure mechanical fasteners 410, as illustrated in FIG. 5A. Alternatively, the holes 510 receive threaded inserts 512, as illustrated in FIG. 5B. The threaded inserts 512, in turn, receive and secure mechanical fasteners 410. In one embodiment, the holes 510 include internal threading to receive threaded inserts 512. In an alternate embodiment, the holes 510 are not tapped and, instead, are configured to receive press-fit inserts rather than threaded inserts 512.

Figure 5C:
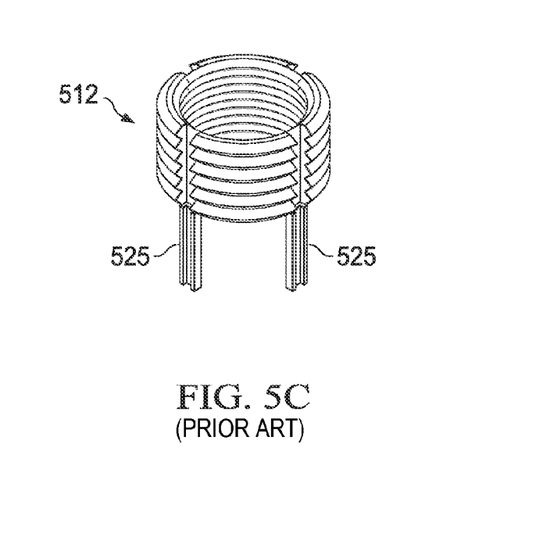
FIG. 5C shows a perspective view of a threaded insert according to an embodiment of the invention.

FIG. 5C shows a perspective view of a threaded insert 512. A threaded insert 512 includes external threading to mechanically connect the insert to a tapped hole 510. Additionally, a threaded insert includes internal threading to receive a mechanical fastener 410. In one embodiment, the threaded inserts 512 include locking mechanisms 525 (e.g., press-fit key-locks) to lock the inserts into place. In one embodiment, the locking mechanism serves to lock an inserted fastener into place. Alternatively, the external or internal threads of a threaded insert 512 include a deformed thread to lock the insert 512 or fastener 410, respectively, into place. In one embodiment, an installer locks the inserts 512 into place utilizing a locking fluid, paste, tape, etc. In one embodiment, the inserts are installed with a sealant or primer to prevent corrosion from dissimilar material contact.

As shown in FIGS. 5A and 5B, the holes 510, inserts 512, and fasteners 410 do not penetrate the exterior surface 305 at points 515 opposite of the holes 510. In one embodiment, the thickness between the deepest interior portion of any hole 510 and the exterior surface 305 at a point 515 opposite of the hole 510 is within a practical range of 0.005 inches to 0.050 inches, depending on specific design and operating requirements. In one embodiment, the thickness between the deepest interior portion of any hole 510 and the exterior surface 305 at a point 515 opposite of the hole 510 is approximately 0.020 inches.

As described above, the component 405 is coupled to the interior surface 310 of the inlet nose cowl 200 by way of mechanical fasteners 410. The mechanical fasteners 410 pass through holes 520 in the component 405 that align with the holes 510 in the interior 310 of the locally thickened fastening portion 505.

While FIGS. 5A and 5B are described above as including holes 510 to receive mechanical fasteners 410, or inserts 512 and fasteners 410, an alternative embodiment includes other features for fastening the component 405 to the locally thickened fastening portion 505 without, or in addition to, the use of holes 510. For example, the locally thickened fastening portion 505 may be machined to include a groove or other similar feature to receive another type of mechanical fastener (e.g., a clamp). Alternatively, the locally thickened fastening portion 505 is machined to include an internally protruding bolt or screw-like feature to penetrate a hole in a component 405 and receive a nut or similar mating fastening component on an opposing side of the component 405. In one embodiment, a component 405 is welded 530 or otherwise bonded to the locally thickened fastening portion 505 with or without the use of mechanical fasteners 410 and holes 510. In one embodiment, the additional thickness provided by the locally thickened fastening portion 505 enables metal bonding to be performed with improved performance results.

Figure 6:
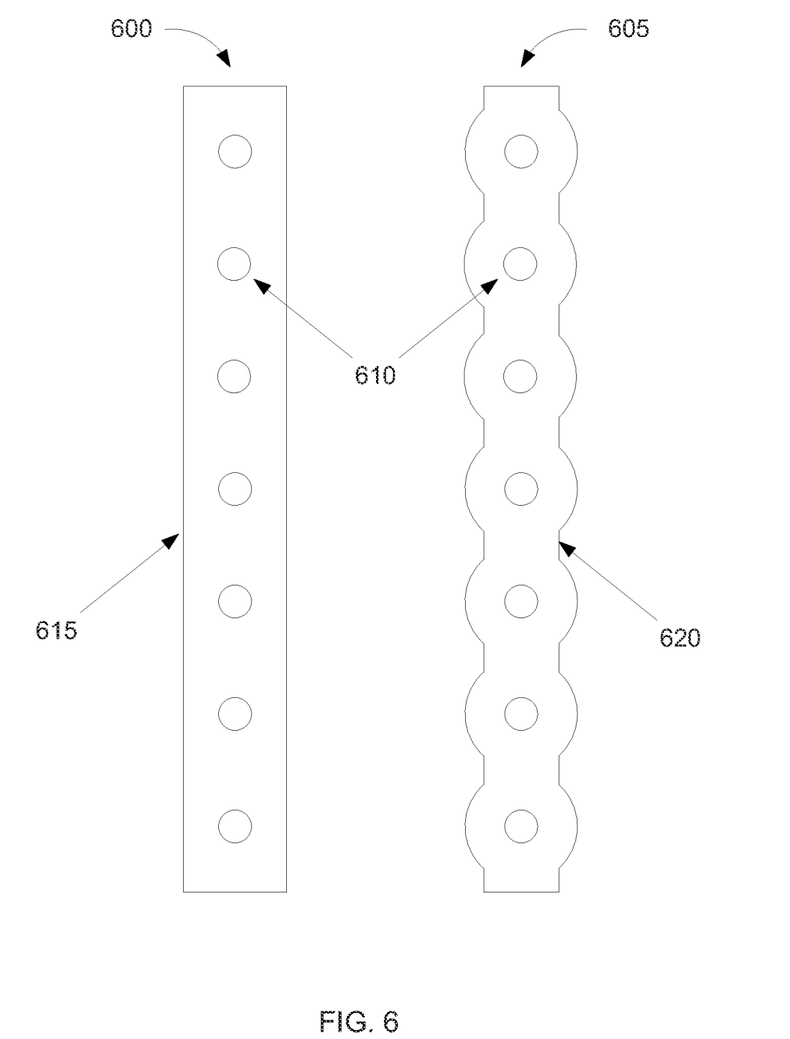
FIG. 6 shows an interior bottom view of alternate embodiments of a locally thickened fastening portion.

FIG. 6 illustrates an interior side bottom view of alternate embodiments of a locally thickened fastening portion. Both embodiments of the locally thickened fastening portion 600 and 605 include a plurality of holes 610 that do not penetrate the exterior surface of the inlet nose cowl 200 as described above. One embodiment of the locally thickened fastening portion 600 includes straight side walls 615 that step or slope down to less thick areas of the inlet nose cowl 200. In contrast, another embodiment of the locally thickened fastening portion 605 includes scalloped side walls 620 that step or slope down to the less thick areas of the inlet nose cowl 200. Scalloped side walls 620 minimize the area of the locally thickened fastening portion 605 and, therefore, contribute less weight to the inlet nose cowl 200 than a locally thickened fastening portion 600 with straight side walls 615.

In one embodiment, the holes 610 are created in a regular pattern. For example, as illustrated in FIG. 6, each of the locally thickened fastening portion 600 and the locally thickened fastening portion 605 include a single column of equally-spaced holes. Alternatively, a locally thickened fastening portion 505 includes multiple columns of holes 510 as illustrated in FIGS. 5A and 5B. In yet another embodiment, the holes are formed in another pattern to address a particular fastening application.

Figure 7:
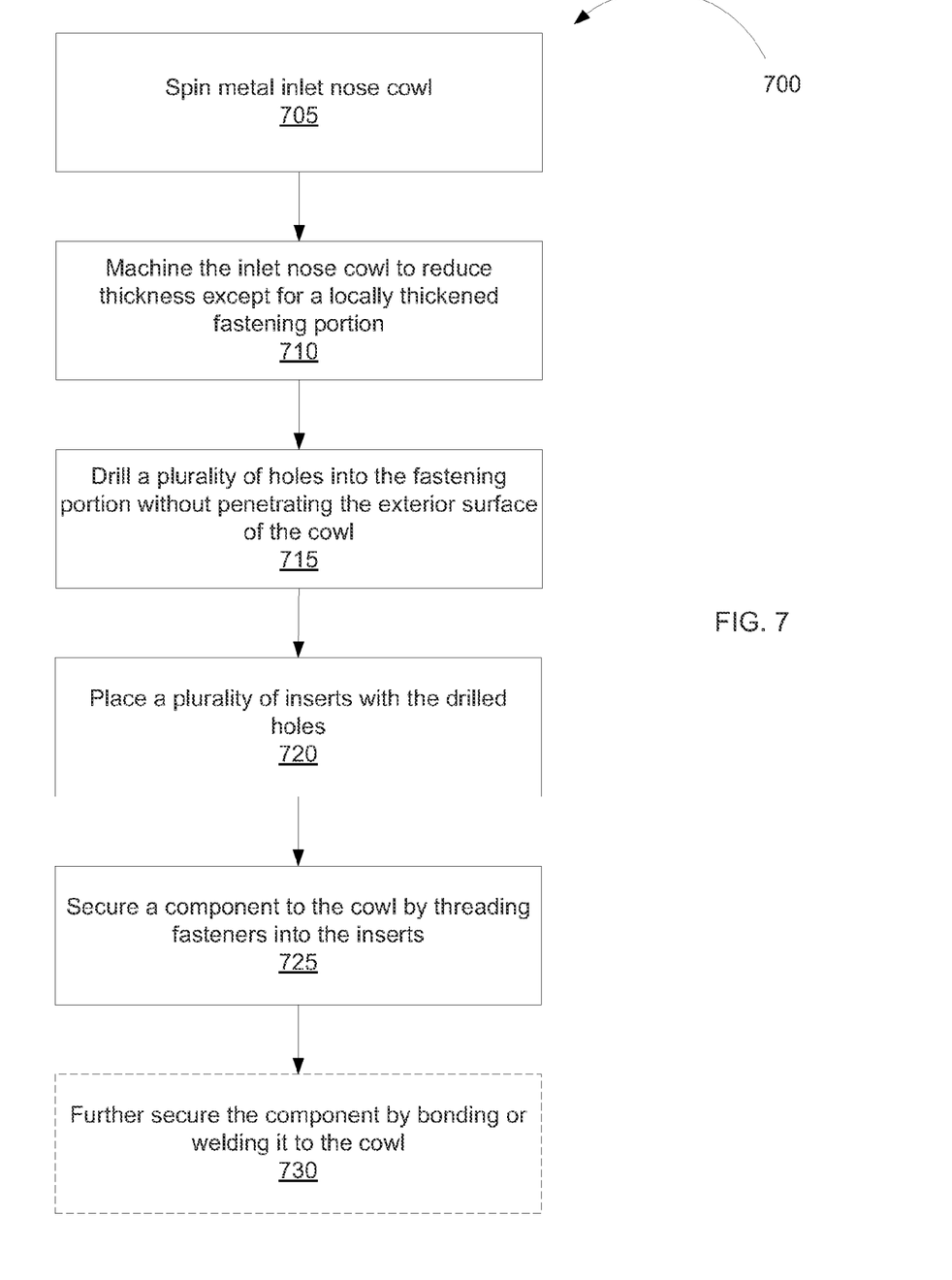
FIG. 7 is a flow chart of an exemplary method of attaching a component to an inlet nose cowl of an aircraft engine housing component according to an embodiment of the invention.

FIG. 7 is a flow chart illustrating an exemplary method 700 of attaching a component to an inlet nose cowl of an aircraft engine housing component according to an embodiment of the invention.

At block 705, the method 700 includes spinning sheet metal to form an inlet nose cowl. Metal spinning, also known as spin forming or spinning, is a metalworking process by which metal is rotated and formed into an axially symmetric or asymmetric part. In one embodiment, the inlet nose cowl is spun using a computer numerical control (CNC) spin forming process.

An inlet nose cowl can be manufactured from a variety of materials such as aluminum, titanium, steel, composite materials, etc. In one embodiment, the inlet nose cowl is manufactured from aluminum. Aluminum is ideally suited because it is lightweight, has good forming properties, transfers heat effectively to facilitate anti-icing, and provides a durable, long lasting, and cosmetically appealing component that performs well in a relatively harsh operating environment.

In one embodiment, the inlet nose cowl is spun to have an extended depth, such as a depth between 18.0 inches and 54.0 inches. In one embodiment, the inlet nose cowl is manufactured from thick gauge sheet metal such as a thickness between 0.180 inches and 0.550 inches.

Inlet nose cowls are often manufactured from thin gauge sheet metal. After forming and final processing, a typical finished inlet nose cowl ranges in thickness (between exterior and interior surfaces) between 0.040 inches and 0.120 inches, depending on specific design and operating requirements. Thinner gauge sheet metal is easier to form than thicker gauge sheet metal with sheet metal forming methods such as draw forming, bulge forming, stretch forming, and drop hammering. The use of this thin gauge sheet metal has lead to numerous advancements in manufacturing technology, but these advancements rely upon the specific use of this thin gauge sheet metal to produce acceptable results. For example, thin gauge sheet metal requires less forming pressure to produce acceptable forming results, and thin gauge sheet metal can be deformed to a greater extent with fewer intermediate heat treating operations than thick gauge sheet metal. These common sheet metal forming methods rely on lower forming pressure to physically yield and deform the thin gauge sheet metal. Fewer intermediate heat treating operations has a positive impact on inlet nose cowl manufacturing costs.

The above-mentioned sheet metal forming methods have, in turn, played a role in limiting the design advancements and value-added features that are possible in inlet nose cowls. For example, an aerodynamic benefit can be attained by increasing the forward to aft length of the inlet nose cowl. The above-mentioned metal forming methods are not well suited for extended depth inlet nose cowls for several reasons. For one, multiple intermediate heat treating operations would be required to allow the sheet metal to be formed to extended depths, which increases manufacturing costs. Furthermore, forming an inlet nose cowl to extended depths results in significant sheet metal thickness variations throughout the inlet nose cowl as different areas of the inlet nose cowl elongate at different rates. Elongation at different rates is an inherent outcome of the above-mentioned metal forming methods.

Starting with thicker gauge aluminum assures that minimum sheet metal thicknesses is not violated in areas of the inlet nose cowl that are prone to more rapid thinning during elongation, but also results in the inlet nose cowl not being weight optimized as the product is often forced to carry greater sheet metal thickness in areas of the inlet nose cowl that are not prone to thinning. Additionally, much of the forming equipment used in the above-mentioned sheet metal forming methods is not suitable for producing extended depth inlet nose cowls.

At block 710, the method 700 includes machining the inlet nose cowl to reduce thickness except for a locally thickened fastening portion. In one embodiment, the locally thickened fastening portion includes straight side walls 615. In an alternate embodiment, the locally thickened fastening portion includes scalloped side walls 620. In one embodiment, the inlet nose cowl is machined using a CNC machining process. The inlet nose cowl is machined to material thicknesses that are optimized for weight and strength. Stress engineering requirements for such components are well known in the aerospace industry. In one embodiment, the portion of the inlet nose cowl surrounding the locally thickened fastening portion is machined to a thickness between 0.040 inches and 0.120 inches.

At block 715, the method 700 includes drilling a plurality of holes into the fastening portion without penetrating the exterior surface of the cowl. In one embodiment, the holes are tapped to include internal threading to receive a threaded insert. A threaded insert includes external threading to mechanically connect the insert to a tapped hole. Additionally, a threaded insert includes internal threading to receive a mechanical fastener. In an alternate embodiment, threaded inserts tap their own threads when inserted into a drilled hole. In yet another embodiment, the holes are not tapped and, instead, are configured to receive a press-fit insert. In one embodiment, the holes are tapped to include internal threading to directly receive mechanical fasteners (e.g., screws, bolts, blind fasteners, custom designed fasteners, etc.). If the holes include internal threading sufficient to secure a mechanical fastener, the method 700 proceeds to block 725.

At block 720, the method 700 includes placing a plurality of inserts within the drilled holes. In one embodiment utilizing threaded inserts, the threaded inserts include locking mechanisms (e.g., press-fit key-locks) to lock the inserts into place. Additionally, the threaded inserts may each include a locking mechanism to lock a fastener into place once screwed into an insert. In one embodiment, the external or internal threads of the inserts include a deformed thread to lock the insert or fastener, respectively, once threaded into place. Alternatively, the method 700 includes locking inserts into place utilizing a locking fluid, paste, tape, etc. In one embodiment, the method 700 includes installing inserts with a sealant or primer to prevent corrosion from dissimilar material contact. As discussed above, in an embodiment in which the holes are tapped to directly receive fasteners, threaded inserts may be omitted.

At block 725, the method 700 includes securing a component to the cowl by threading fasteners into the inserts or threaded holes. In one embodiment, the component is secured by human manipulation of the fasteners. In an alternate embodiment, the component is secured by an automated process in which a machine manipulates the fasteners.

At block 730, the method 700 optionally includes (illustrated by way of the broken-line box) welding or bonding the component to further secure it to the inlet nose cowl. The combination of the mechanical fasteners with welding or bonding results in a stronger mechanical connection.

In the foregoing specification, the invention has been described with reference to specific exemplary embodiments thereof. It will be evident that various modifications may be made thereto without departing from the broader spirit and scope of the invention. Although embodiments of the invention are described with reference to an inlet nose cowl, embodiments of the invention also apply to other aircraft components with an external airflow surface and internal surface to which another component is fastened. For example, the apparatus and methods described herein may apply to fan cowls, exhaust systems, fuselage, leading edges of wings, stabilizers, fins, etc. Examples and explanations using an inlet nose cowl have been used in the description for the purpose of illustration and are not intended to be limiting. Additionally, the order in which operations described with reference to method 700 may be performed in a different order than described and illustrated. The specification and drawings are, accordingly, to be regarded in an illustrative sense rather than a restrictive sense.

What is claimed is:

1. An aircraft nacelle comprising:
   an inlet nose cowl comprising a single piece of sheet metal material between and defining at least a portion of an exterior surface and an interior surface, wherein the exterior surface is exposed to external airflow during flight, and wherein the single piece of sheet metal material forms a locally thickened fastening portion defining at least a portion of the exterior and interior surfaces,
      wherein a thickness of the inlet nose cowl between the exterior surface and the interior surface is greater at the fastening portion than at an area surrounding the fastening portion and an area of the interior surface on the locally thickened fastening portion is substantially parallel to an area of the exterior surface on the locally thickened fastening portion, and
      wherein a bulkhead is fastened to the substantially parallel area of the interior surface on the locally thickened fastening portion with mechanical fasteners, wherein the mechanical fasteners do not penetrate the exterior surface.

2. The aircraft nacelle of claim 1, wherein the fastening portion comprises a plurality of holes drilled into the interior surface of the fastening portion, and wherein the holes are configured to receive the mechanical fasteners and do not penetrate the exterior surface.

3. The aircraft nacelle of claim 2, wherein the fastening portion further comprises a plurality of inserts within the holes, and wherein the inserts are configured to receive the mechanical fasteners.

4. The aircraft nacelle of claim 3, wherein the inserts are threaded inserts including internal and external threading, the internal threading being configured to receive the mechanical fasteners.

5. The aircraft nacelle of claim 2, wherein the holes are threaded to receive the mechanical fasteners.

6. The aircraft nacelle of claim 1, wherein the fastening portion includes scalloped side walls that step or slope down to the area surrounding the fastening portion, the scalloped side walls resulting in the fastening portion having less surface area on the interior surface between each hole than on the interior surface surrounding each hole.

7. The aircraft nacelle of claim 1, wherein the bulkhead is bonded or welded to the fastening portion in addition to being secured with fasteners.

8. A method of attaching a bulkhead to an inlet nose cowl of an aircraft engine housing component, the inlet nose cowl comprising a single piece of sheet metal material between and defining at least a portion of an exterior surface and an interior surface, wherein the exterior surface is exposed to external airflow during flight, and wherein the single piece of sheet metal material forms a locally thickened fastening portion defining at least a portion of the exterior and interior surfaces, wherein an area of the interior surface on the locally thickened fastening portion is substantially parallel to an area of the exterior surface on the locally thickened fastening portion, the method comprising:
   fastening the bulkhead to the substantially parallel area of the interior surface on the locally thickened fastening portion of the interior surface of the inlet nose cowl with mechanical fasteners, wherein a thickness of the inlet nose cowl between the exterior surface and the interior surface is greater at the fastening portion than at an area surrounding the locally thickened fastening portion, and wherein the mechanical fasteners do not penetrate the exterior surface.

9. The method of claim 8, further comprising:
   drilling a plurality of holes into the fastening portion of the interior surface, wherein the holes are configured to receive the mechanical fasteners and do not penetrate the exterior surface.

10. The method of claim 9, further comprising:
    placing a plurality of threaded inserts within the holes, wherein the threaded inserts are configured to receive the mechanical fasteners.

* * * * *